United States Patent
Pham et al.

(10) Patent No.: US 7,820,760 B2
(45) Date of Patent: Oct. 26, 2010

(54) AMPHIPHILIC BLOCK COPOLYMER-MODIFIED EPOXY RESINS AND ADHESIVES MADE THEREFROM

(75) Inventors: Ha Q. Pham, Lake Jackson, TX (US); Kandathil E. Verghese, Lake Orion, MI (US); Marvin L. Dettloff, Lake Jackson, TX (US)

(73) Assignee: Dow Global Technologies Inc.

( * ) Notice: Subject to any disclaimer, the term of this patent is extended or adjusted under 35 U.S.C. 154(b) by 738 days.

(21) Appl. No.: 11/663,805

(22) PCT Filed: Nov. 2, 2005

(86) PCT No.: PCT/US2005/039962

§ 371 (c)(1),
(2), (4) Date: Jun. 26, 2007

(87) PCT Pub. No.: WO2006/052726

PCT Pub. Date: May 18, 2006

(65) Prior Publication Data

US 2009/0123759 A1    May 14, 2009

Related U.S. Application Data

(60) Provisional application No. 60/626,619, filed on Nov. 10, 2004.

(51) Int. Cl.
*B32B 27/38* (2006.01)
*C08L 63/00* (2006.01)
*C09J 163/00* (2006.01)

(52) U.S. Cl. ........................ 525/90; 525/92 A

(58) Field of Classification Search ........... 525/90, 525/92 A
See application file for complete search history.

(56) References Cited

U.S. PATENT DOCUMENTS

| 3,804,735 A | 4/1974 | Radlove et al. |
|---|---|---|
| 3,892,819 A | 7/1975 | Najvar |
| 3,948,698 A | 4/1976 | Elrick et al. |
| 4,014,771 A | 3/1977 | Rosenkranz et al. |
| 4,119,609 A | 10/1978 | Allen et al. |
| 4,431,782 A | 2/1984 | Harris et al. |
| 5,278,257 A | 1/1994 | Mulhaupt et al. |
| 6,884,854 B2 | 4/2005 | Schoenfeld et al. |
| 6,998,011 B2 | 2/2006 | Schoenfeld et al. |
| 2003/0099826 A1 | 5/2003 | Juras et al. |
| 2003/0194548 A1 | 10/2003 | McLeod et al. |
| 2004/0181013 A1 | 9/2004 | Schenkel |

FOREIGN PATENT DOCUMENTS

| CA | 2 510 486 | | 7/2004 |
|---|---|---|---|
| CN | 1156166 | * | 8/1997 |
| EP | 1356911 | | 10/2003 |
| EP | 1435320 | | 7/2004 |
| JP | H9-324110 | | 12/1997 |

OTHER PUBLICATIONS

Yu et al., STN AN 2000:36594, abstracting CN 1156166 (Aug. 1997).*
Nikaido et al., STN AN 1998:430836, abstracting JP 10-182831 (Jul. 1998).*
Nikaido et al., electronic translation of specification of JP 10-182831 (Jul. 1998).*
Journal of Polymer Science, Part B: Polymer Phusics, 2001, 39 (23), 2996-3010.

* cited by examiner

*Primary Examiner*—Jeffrey C Mullis

(57) ABSTRACT

A curable adhesive epoxy resin composition including (a) an epoxy resin; (b) an amphiphilic block copolymer containing at least one epoxy resin miscible block segment and at least one epoxy resin immiscible block segment; wherein the immiscible block segment comprises at least one polyether structure provided that the polyether structure of said immiscible block segment contains at least one or more alkylene oxide monomer units having at least four carbon atoms; in an amount such that when the epoxy resin composition is cured, the bond strength of the resulting cured epoxy adhesive resin composition increases compared to an epoxy resin composition without said amphiphilic polyether block copolymer; and (c) at least one curing agent. The amphiphilic block copolymer is preferably an all polyether block copolymer such as a PEO-PBO diblock copolymer or a PEO-PBO-PEO triblock copolymer.

19 Claims, No Drawings

AMPHIPHILIC BLOCK COPOLYMER-MODIFIED EPOXY RESINS AND ADHESIVES MADE THEREFROM

CROSS REFERENCE TO RELATED APPLICATION

This application is a 371 of PCT/US2005/039962 filed Nov. 2, 2005, which claims the benefit of U.S. Provisional Application Ser. No. 60/626,619 filed Nov. 10, 2004.

The present invention relates to adhesive epoxy resin compositions modified with amphiphilic polyether block copolymers to increase the fracture resistance or toughness; and the bond strength of the cured adhesive coating composition.

Epoxy resins are typically cured with hardeners or curing agents, and when cured, the resins are known for their thermal and chemical resistance. The cured epoxy resins also display good mechanical properties but they lack toughness and tend to be very brittle upon cure. The lack of toughness of the epoxy resins is especially true as the crosslink density or Tg of the resins increases.

Recently, there have been several studies related to increasing the fracture resistance or toughness of epoxy resins by adding to the epoxy resin various block copolymers. Much of the previous work is focused on the use of amphiphilic diblock copolymers having an epoxy miscible block and an epoxy immiscible block in which the epoxy miscible block is poly(ethylene oxide) (PEO) and the immiscible block is a saturated polymeric hydrocarbon. Although effective at providing templated epoxies with appealing property sets, the known block copolymer materials are too expensive to be used in some applications.

For example, Journal of Polymer Science, Part B: Polymer Physics, 2001, 39(23), 2996-3010 describes the use of a poly (ethylene oxide)-b-poly(ethylene-alt-propylene) (PEO-PEP) diblock copolymer to provide micellar structures in cured epoxy systems; and that block copolymers self-assembled into vesicles and spherical micelles can significantly increase the fracture resistance of model bisphenol A epoxies cured with a tetrafunctional aromatic amine curing agent. And, Journal of the American Chemical Society, 1997, 119(11), 2749-2750 describes epoxy systems with self-assembled microstructures brought about using amphiphilic PEO-PEP and poly(ethylene oxide)-b-poly(ethyl ethylene) (PEO-PEE) diblock copolymers. These block copolymer-containing systems illustrate characteristics of self-assembly.

Other block copolymers incorporating an epoxy-reactive functionality in one block have been used as modifiers for epoxy resins to achieve nanostructured epoxies. For example, Macromolecules, 2000, 33(26) 9522-9534 describes the use of poly(epoxyisoprene)-b-polybutadiene (BIxn) and poly (methylacrylate-co-glycidyl methacrylate)-b-polyisoprene (MG-I) diblock copolymers that are amphiphilic in nature and are designed in such a way that one of the blocks can react into the epoxy matrix when the resin is cured. Also, Journal of Applied Polymer Science, 1994, 54, 815 describes epoxy systems having submicron scale dispersions of poly(caprolactone)-b-poly(dimethylsiloxane)-b-poly(caprolactone) triblock copolymers.

While some of the previously known diblock and triblock copolymers mentioned above are useful for improving the toughness of epoxy resins, the preparation of such previously known block copolymers is complicated. The previously known block copolymers require multiple steps to synthesize and therefore are less economically attractive from a commercial standpoint.

Still other self-assembled amphiphilic block copolymers for modifying thermosetting epoxy resins to form nanostructured epoxy thermosets are known. For example, Macromolecules, 2000, 33, 5235-5244 and Macromolecules, 2002, 35, 3133-3144, describe the addition of a poly(ethylene oxide)-b-poly(propylene oxide) (PEO-PPO) diblock and a poly(ethylene oxide)-b-poly(propylene oxide)-b-poly(ethylene oxide) (PEO-PPO-PEO) triblock to an epoxy cured with methylene dianiline. And, a polyether block copolymer such as a PEO-PPO-PEO triblock is also known to be used with an epoxy resin as disclosed in Japanese Patent Application Publication No. H9-324110.

Japanese Patent Application Publication No. H9-324110 discloses a curable epoxy resin composition which is made by adding an ethylene oxide-propylene oxide block co-polymer into the curable epoxy resin, and which produces the epoxy resin cured body with a sea-island structure, in which the fine particles of the ethylene oxide-propylene oxide block co-polymer are dispersed evenly, by the curing of the epoxy resin. The curable epoxy resin with the block co-polymer is used as an adhesive agent. The cured epoxy resin body from said curable epoxy resin with the block co-polymer is said to have an improved impact resistance and a reduced brittleness.

However, there is still a need in the adhesive industry to further enhance the toughness and the bond strength of the epoxy resin used in adhesive applications while maintaining all other crucial properties of the resin.

It is therefore desired to provide an alternative block copolymer that is useful for improving the toughness and bond strength of epoxy resins by a self assembly process; and that is useful for adhesive applications.

The present invention is directed to a curable adhesive epoxy resin composition comprising (a) an epoxy resin;

(b) an amphiphilic block copolymer containing at least one epoxy resin miscible block segment and at least one epoxy resin immiscible block segment; wherein the immiscible block segment comprises at least one polyether structure provided that the polyether structure of said immiscible block segment contains at least one or more alkylene oxide monomer units having at least four carbon atoms; in an amount such that when the epoxy resin composition is cured, the bond strength of the resulting cured epoxy adhesive resin composition increases compared to an epoxy resin composition without said amphiphilic polyether block copolymer; and (c) at least one curing agent.

One embodiment of the present invention is directed to an epoxy resin modified with an amphiphilic polyether block copolymer containing at least one epoxy resin miscible block segment and at least one epoxy resin immiscible block segment; wherein both the miscible block segment and the immiscible block segment comprises at least one polyether structure.

By the addition of a small amount (between 1-5 wt. percent) of an amphiphilic di-block copolymer to an epoxy resin, we are able to create a second phase morphology that is at the nano-scale (15-25 nanometers) due to self assembly that imparts tremendous improvements in toughness and ductility and bond strength to epoxy adhesive resins without adversely affecting other properties such as glass transition temperature, moisture resistance, and thermal resistance.

The solution was provided by the addition of a small (1-5 wt. percent) amount of an amphiphilic block copolymer (preferably one which has an elastomeric polymer as one of the components) that self assembles in the host epoxy resin on a nanometer size scale. The copolymer may be added at any time during the processing of the epoxy resin. If the final epoxy product is a blend of several epoxies and solvents, the copolymer can be added during the blending process.

Some of the beneficial features of using the amphiphilic polyether block copolymer of the present invention to toughen resins and improve their bond strength include, for example: (1) the self assembly characteristics of the amphiphilic block copolymer, (2) the ability of the block copolymer to assemble at a nanometer length scale, (3) the ability of the block copolymer to create a very uniform dispersion across the entire resin monomer matrix, and (4) the ability to use low loading levels of the block copolymer to achieve toughening and bond strength results.

Some of the advantages of using the amphiphilic polyether block copolymer of the present invention include, for example: (1) the ability of the block copolymer to improve toughness and bond strength of the host resin without adversely affecting other key properties such as glass transition temperature, modulus and viscosity of the host resin, (2) the ability of the resin to retain certain aesthetic qualities such as appearance that is crucial in certain applications, and (3) the ability to consistently and reproducibly create morphology prior to or during the curing of the resin itself.

The present invention includes an adhesive composition with improved toughness and bond strength comprising an epoxy resin monomer system modified with an amphiphilic block copolymer, such as a polyether block copolymer, for the resin system. These modified epoxy resins, when cured, show improved T-Peel results compared to a non-modified epoxy resin with only minor changes in modulus and glass transition temperature (Tg) behavior.

Templated thermoset epoxy polymers with nanoscale self-assembled morphologies, exhibit an attractive combination of improved toughness, bond strength and retention of material properties such as modulus and Tg. The epoxy thermoset polymers can be prepared, for example, by dispersing an amphiphilic block copolymer in a resin monomer matrix, where the copolymer can undergo self-assembly, and then curing the resin. Self-assembled resins that exhibit surfactant-like morphologies provide enhanced fracture toughness and bond strength at very low (for example, from 1 to 5 weight percent) block copolymer loadings. Amphiphilic block copolymers that are capable of self assembly when mixed with the resin monomer must have at least one block that is miscible with the resin/curing agent mixture prior to cure, and at least one block that is immiscible with the resin/curing agent mixture prior to cure.

One embodiment of the present invention is aimed at preparing an all polyether block copolymer, for example, a diblock copolymer, such as those based on poly(ethylene oxide)-b-(butylene oxide) (PEO-PBO), that self assembles in epoxy resin systems. At sufficiently high butylene oxide block lengths (for example, Mn=1000 or greater) these block structures are found to be effective at templating the epoxy resin monomer into micellar structures such as spherical micelles.

The polyether block copolymer useful in the present invention includes one or more polyether block copolymers comprising at least one epoxy miscible polyether block segment derived from an alkylene oxide such as ethylene oxide (EO) and at least one epoxy immiscible polyether block segment derived from an alkylene oxide with at least greater than 3 carbon atoms, for example 1,2-epoxy butane known commonly as butylene oxide (BO). The immiscible block segment may also be comprised of mixtures of $C_4$ or higher carbon analogue monomers that are copolymerized together to provide the immiscible block segment. The immiscible block may also contain lower molecular weight co-monomers such as EO. The polyether block copolymer contains at least one epoxy resin miscible polyether block segment, E, and at least one epoxy resin immiscible polyether block segment, M.

The present invention polyether block copolymer component may contain at least two or more amphiphilic polyether block copolymer segments. Examples of the amphiphilic polyether block copolymer may be selected from the group consisting of a diblock (EM); a linear triblock (EME or EME); a linear tetrablock (EMEM); a higher order multiblock structure $(EMEM)_X E$ or $(MEME)_X M$, where X is an integer value ranging from 1-3; a branched block structure; or a star block structure; and any combination thereof. The amphiphilic polyether block copolymer consisting of the branched block structures or star block structures contains at least one epoxy monomer miscible block and at least one epoxy monomer immiscible block.

Examples of the epoxy resin miscible polyether block segment, E, include a polyethylene oxide block, a propylene oxide block, poly(ethylene oxide-co-propylene oxide) block, a poly(ethylene oxide-ran-propylene oxide) block, and mixtures thereof. Preferably, the epoxy resin miscible polyether block segment useful in the present invention is a polyethylene oxide block.

Generally, the epoxy resin immiscible polyether block segment, M, useful in the present invention is an epoxidized alpha olefin having carbon atoms of from $C_4$ to $C_{20}$. Examples of the epoxy resin immiscible polyether block segment, M, include a polybutylene oxide block, a polyhexylene oxide block derived from 1,2 epoxy hexane, a polydodecylene oxide block derived from 1,2-epoxy dodecane, and mixtures thereof. Preferably, the epoxy resin immiscible polyether block segment useful in the present invention is a polybutylene oxide block.

In another embodiment of the present invention, when the polyether block copolymer has a multiblock copolymer structure, other block segments in addition to E and M may be present in the block copolymer. Examples of other miscible segments of the block copolymer include polyethylene oxide, polymethyl acrylate, and mixtures thereof. Examples of other immiscible segments of the block copolymer include polyethylene propylene (PEP), polybutadiene, polyisoprene, polydimethyl siloxane, polybutylene oxide, polyhexylene oxide, polyalkyl methyl methacrylate, such as polyethyl hexyl methacrylate, and mixtures thereof.

The amphiphilic polyether block copolymers which can be employed in the practice of the present invention include for example, but are not limited to, a diblock copolymer, a linear triblock, a linear tetrablock, a higher order multiblock structure, a branched block structure, or star block structure. For example, the polyether block copolymer may contain a poly (ethylene oxide) block, a poly(propylene oxide) block or poly(ethylene oxide-co-propylene oxide) block; and an alkylene oxide block based on a $C_4$ or higher carbon analog block, such as, for example, 1,2-epoxybutane, 1,2-epoxyhexane, 1,2-epoxydodecane, or 1,2-epoxyhexadecane block. Other examples of the alkylene oxide blocks may include Vikolox™ epoxidized alpha olefins, including C10-C30+ olefins, commercially available from Atofina.

Preferred examples of suitable block copolymers useful in the present invention include amphiphilic polyether diblock copolymers such as, for example, poly(ethylene oxide)-b-poly(butylene oxide)(PEO-PBO) or amphiphilic polyether triblock copolymers such as, for example, poly(ethylene oxide)-b-poly(butylene oxide)-b-poly(ethylene oxide) (PEO-PBO-PEO).

The amphiphilic polyether block copolymer used in the present invention can have a number average molecular weight (Mn) of from 1,000 to 30,000, for the combination of both block lengths. Most preferably, the molecular weight of the polyether block copolymer is between 3,000 and 20,000. Prior art materials derived from block copolymers in which the immiscible block has a very low solubility parameter (polymeric hydrocarbons) microphase separate prior to cure. The polyether containing block structures of the present invention, on the other hand, can either be microphase separated prior to cure at the preferred molecular weights, or form micelles while the curing process is being performed.

The composition of the block copolymer can range from 90 percent epoxy resin miscible polyalkylene oxide block and 10 percent epoxy resin immiscible polyalkylene oxide block to 10 percent epoxy resin miscible poly alkylene oxide block and 90 percent epoxy resin immiscible polyalkylene oxide block.

Small amounts of homopolymers from each of the respective block segments may be present in the final amphiphilic polyether block copolymer of the present invention. For example, from 1 weight percent to 50 weight percent, preferably from 1 weight percent to 10 weight percent, of a homopolymer that is similar or identical in structure with the miscible or the immiscible block can be added to the composition of the present invention comprising an epoxy monomer system and an amphiphilic polyether block copolymer.

The amount of amphiphilic polyether block copolymers employed in the epoxy resin composition of the present invention depends on a variety of factors including the equivalent weight of the polymers, as well as the desired properties of the products made from the composition. In general, the amount of amphiphilic polyether block copolymers employed in the present invention may be from 0.1 weight percent to 30 weight percent, preferably from 0.5 weight percent to 10 weight percent and, most preferably, from 1 weight percent to 5 weight percent, based on the weight of the resin composition.

The amphiphilic block copolymers of the present invention preferably increase the toughness or fracture resistance and the bond strength of the epoxy resin, preferably at low (for example, less than 5 weight percent) loadings of block copolymer in the epoxy resin composition. Generally, addition of from 1 wt percent to 5 wt percent of a polyether block copolymer to the epoxy resin composition increases the toughness of the resin composition by a factor of 1.5 times to 2.5 times that of a control; and increases the bond strength (as measured in terms of T-Peel) of up to 4.6 times that of a control.

The present invention epoxy resin composition may contain at least one or more amphiphilic polyether block copolymers mixed with the epoxy resin. In addition, two or more different amphiphilic block copolymers may be blended together to make up the block copolymer component of the present invention so long as one of the block copolymers is a polyether block copolymer. More than one block copolymer can be combined to gain additional control of the nanostructure, that is, shape and dimension.

In addition to the polyether block copolymer used in the resin composition, other amphiphilic block copolymers may be used as a secondary block copolymer component in the resin composition of the present invention. Examples of additional amphiphilic block copolymers, other than the polyether block copolymers of the present invention, which can be employed in the practice of the present invention include for example, but are not limited to, poly(ethylene oxide)-b-poly(ethylene-alt propylene) (PEO-PEP), poly(isoprene-ethylene oxide) block copolymers (PI-b-PEO), poly(ethylene propylene-b-ethylene oxide) block copolymers (PEP-b-PEO), poly(butadiene-b-ethylene oxide) block copolymers (PB-b-PEO), poly(isoprene-b-ethylene oxide-b-isoprene) block copolymers (PI-b-PEO-PI), poly(isoprene-b-ethylene oxide-b-methylmethacrylate) block copolymers (PI-b-PEO-b-PMMA); and mixtures thereof. Generally, the amount of secondary amphiphilic block copolymer used in the resin composition may be from 0.1 weight percent to 30 weight percent.

The polyether block copolymers of the present invention provide uniformly dispersed and uniformly scaled nano-sized structures which preferably form (template) in the liquid resin matrix due to micellization brought by the balance of immiscibility of one block segment and miscibility of the other block segment. The micellar structures are preserved into the cured epoxy thermoset, or form during the curing process, producing epoxy thermoset materials exhibiting improved toughness, improved fracture resistance, improved impact resistance, and improved bond strength while maintaining Tg, modulus and other properties at the same level as the unmodified epoxy thermoset. The micellar morphology of the nano-templated resin can be for example, spherical, worm-like, and vesicles. Micellar morphologies are advantageously obtained at low (for example, less than 5 weight percent) concentrations of block copolymers; that is, the morphological features are not associated with one another or packed into a three dimensional lattice. At higher concentrations self-assembled structures can form spherical, cylindrical, or lamellar morphological features that are associated with one another by lattice interactions, also at a nanometer size scale.

It is believed that the increase in fracture resistance occurs when the block copolymers self-assemble into a nanoscale morphology such as worm-like, vesicle or spherical micelle morphology. While it is not well understood how to predict which micelle morphology, if any, will occur in different resins, it is believed that some of the factors that determine the self-assembled morphology may include, for example, (i) the choice of monomers in the block copolymer, (ii) the degree of asymmetry in the block copolymer, (iii) the molecular weight of the block copolymer, (iv) the composition of the epoxy resin, and (v) the choice of curing agent for the resin. Apparently, a nanoscale morphology plays an important role in creating toughness and bond strength in the epoxy adhesive resin product of the present invention.

As an illustration of one embodiment of the present invention, a thermosetting resin, such as an epoxy resin, may be blended with a polyether block copolymer, for example, a poly(ethylene oxide)-b-poly(butylene oxide) (PEO-PBO) diblock copolymer wherein the PBO is the epoxy immiscible hydrophobic soft component of the diblock copolymer and the PEO is the epoxy miscible component of the diblock copolymer. The curable epoxy resin composition including the PEO-PBO block copolymer increases the impact resistance of the cured epoxy resin body.

The PEO-PBO block copolymer can be indicated generally by the chemical formula $(PEO)_x\text{-}(PBO)_y$ wherein the subscripts x and y are the number of monomer units of polyethylene oxide and polybutylene oxide in each block, respectively and are positive numbers. Generally, x should be from 15 to 85 and the molecular weight of the structural part $(PEO)_x$ should be from 750 to 100,000. Subscript y should be from 15 to 85 and the molecular weight represented by the structural part $(PBO)_y$ should be from 1,000 to 30,000. Also, a single PEO-PBO diblock copolymer may be used alone, or more than one PEO-PBO diblock copolymer may be combined to be used as well.

In one embodiment of the present invention, a PEO-PBO diblock copolymer is used wherein the diblock copolymer has 20 percent PEO and 80 percent PBO to 80 percent PEO and 20 percent PBO; and has block sizes of molecular weights (Mn) of PBO 2000 or higher and molecular weights of PEO 750 or higher; and provides various morphologies. For example, the present invention includes a diblock with a PBO block length of from 2,500 to 3,900 that provides spherical micelles. Another example of the present invention includes a diblock with a PBO segment of 6,400 that provides worm-like micelles. Still another example of the present invention is a diblock with a short (Mn=750) PEO block segment that provides an agglomerated vesicle morphology. Yet another example of the present invention includes a mixture of a PEO-PBO diblock with a low molecular weight PBO homopolymer that provides a spherical micelle in which the PBO homopolymer sequesters into the micelle without forming a separate macrophase; the PBO homopolymer macrophase separates when added without the diblock present.

In general, the amphiphilic block copolymers used in the present invention can be prepared in a single synthetic process, wherein one monomer is polymerized to prepare an initial block, followed by simple introduction of the second monomer type which is then polymerized onto the terminus of the first block copolymer until the polymerization process is complete. It is also possible to make the blocks separately, preparing the first block and then polymerizing the second block onto the terminus of the first block in a second synthetic step. The difference in solubility of the two block fragments is sufficient that the block copolymer may be used to modify a variety of epoxy materials. The block copolymers can be prepared by Group I metals, such as sodium, potassium or cesium moderated anionic polymerization. The polymerization can be carried out neat or using a solvent. The temperature of the polymerization reaction can be for example from 70° C. to 140° C. at atmospheric pressure to slightly above atmospheric pressure. The synthesis of the block copolymer may be carried out, for example, as described in Whitmarsh, R. H., In Nonionic Surfactants Polyoxyalkylene Block Copolymers; Nace, V. M., Ed.; Surfactant Science Series; Vol. 60; Marcel Dekker, N.Y., 1996; Chapter 1.

In a preferred embodiment, the block segments of the block copolymers are prepared by the ring-opening polymerization of 1,2-epoxy alkenes.

A thermoset material is defined as being formed of polymer chains of variable length bonded to one another via covalent bonds, so as to form a three-dimensional network. Thermoset epoxy materials can be obtained, for example, by reaction of a thermosetting epoxy resin, with a hardener such as of an amine type.

Epoxy resins useful in this invention include a wide variety of epoxy compounds. Typically, the epoxy compounds are epoxy resins which are also referred to as polyepoxides. Polyepoxides useful herein can be monomeric (for example, the diglycidyl ether of bisphenol A, novolac-based epoxy resins, and tris-epoxy resins), higher molecular weight advanced resins (for example, the diglycidyl ether of bisphenol A advanced with bisphenol A) or polymerized unsaturated monoepoxides (for example, glycidyl acrylates, glycidyl methacrylate, allyl glycidyl ether, etc.), homopolymers or copolymers. Most desirably, epoxy compounds contain, on average, at least one pendant or terminal 1,2-epoxy group (that is, vicinal epoxy group) per molecule.

Examples of useful polyepoxides include the polyglycidyl ethers of both polyhydric alcohols and polyhydric phenols; polyglycidyl amines; polyglycidyl amides; polyglycidyl imides; polyglycidyl hydantoins; polyglycidyl thioethers; epoxidized fatty acids or drying oils, epoxidized polyolefins; epoxidized di-unsaturated acid esters; epoxidized unsaturated polyesters; and mixtures thereof. Numerous polyepoxides prepared from polyhydric phenols include those which are disclosed, for example, in U.S. Pat. No. 4,431,782. Polyepoxides can be prepared from mono-, di- and tri-hydric phenols, and can include the novolac resins. Polyepoxides can include the epoxidized cyclo-olefins; as well as the polymeric polyepoxides which are polymers and copolymers of glycidyl acrylate, glycidyl methacrylate and allylglycidyl ether. Suitable polyepoxides are disclosed in U.S. Pat. Nos. 3,804,735; 3,892,819; 3,948,698; 4,014,771 and 4,119,609; and Lee and Neville, Handbook of Epoxy Resins, Chapter 2, McGraw Hill, N.Y. (1967).

While the present invention is applicable to polyepoxides in general, preferred polyepoxides are glycidyl polyethers of polyhydric alcohols or polyhydric phenols having an epoxide equivalent weight (EEW) of from 150 to 3,000, preferably an EEW of from 170 to 2,000. These polyepoxides are usually made by reacting at least two moles of an epihalohydrin or glycerol dihalohydrin with one mole of the polyhydric alcohol or polyhydric phenol, and a sufficient amount of a caustic alkali to combine with the halohydrin. The products are characterized by the presence of more than one epoxide group, that is, a 1,2-epoxy equivalency greater than one.

The polyepoxide useful in the present invention can also be a cycloaliphatic diene-derived epoxide. These polyepoxides can be cured either thermally, cationically or photoinitiation (example UV initiated cure). There are several cycloaliphatic epoxides that are made and marketed by The Dow Chemical Company such as 3,4-epoxycyclohexylmethyl-3,4-epoxycyclohexyl carboxylate; 1,2-epoxy-4-vinylcyclohexane; bis(7-oxabicyclo[4.1.0]hept-3-ylmethyl hexanedioic acid ester; 3,4-epoxycyclohexanecarboxylate methyl ester; and mixtures thereof.

The polyepoxide may also include a minor amount of a monoepoxide, such as butyl and higher aliphatic glycidyl ethers, phenyl glycidyl ether, or cresyl glycidyl ether, as a reactive diluent. Such reactive diluents are commonly added to polyepoxide formulations to reduce the working viscosity thereof, and to give better wetting to the formulation. As is known in the art, a monoepoxide affects the stoichiometry of the polyepoxide formulation and adjustments are made in the amount of curing agent and other parameters to reflect that change.

Generally, the amount of polyepoxide used in the present invention may be in the range from 30 weight percent to 95 weight percent.

The curing agent component (also referred to as a hardener or cross-linking agent) useful in the present invention may be any compound having an active group being reactive with the epoxy group of the epoxy resin. The chemistry of such curing agents is described in the previously referenced books on epoxy resins. The curing agent useful in the present invention includes nitrogen-containing compounds such as amines and their derivatives; oxygen-containing compounds such as carboxylic acid terminated polyesters, anhydrides, phenol-formaldehyde resins, amino-formaldehyde resins, phenol, bisphenol A and cresol novolacs, phenolic-terminated epoxy resins; sulfur-containing compounds such as polysulfides, polymercaptans; and catalytic curing agents such tertiary amines, Lewis acids, Lewis bases and combinations of two or more of the above curing agents.

Practically, polyamines, dicyandiamide, diaminodiphenylsulfone and their isomers, aminobenzoates, various acid anhydrides, phenol-novolac resins and cresol-novolac resins, for example, may be used in the present invention, but the present invention is not restricted to the use of these compounds.

Generally, the amount of curing agent used in the present invention may be in the range from 1 weight percent to 70 weight percent.

As an optional component useful in the present invention, curing catalysts can be added to the epoxy resin composition. Examples of curing catalysts include imidazole derivatives such as z-ethyl-4-methyl imidazole; tertiary amines; and organic metallic salts. Generally, the curing catalyst is used in an amount of from 0 to 6 parts by weight based on the total weight of the curable composition.

Another optional component useful in the present invention, a viscosity modifier can be added to the epoxy resin composition. Viscosity modifiers used in the present invention may include for example fumed silica, calcium carbonate. Generally, the viscosity modifier used in the present invention may be used in an amount of from 0 to 70 parts by weight based on the total weight of the curable composition.

The curable epoxy resin composition according to the present invention may also contain usual additives such as fillers, dyes, pigments, thixotropic agents, wetting agent, surfactants, fluidity control agents, stabilizers, diluents that aid processing, flexibilizers, toughening agents, and solvents. The amount of the optional additives used in the epoxy resin composition generally may be from 0 weight percent to 70 weight percent depending on the final formulation. In another embodiment of the present invention, when a filler is used, in some instances a filler can be used in the curable resin composition in a concentration of up to 300 phr.

Other compounds useful in the present invention are described in Handbook of Adhesive Technology, Edited by A. Pizzi and K. L. Mittal, Chapter 33, Epoxy Resin Adhesives, 1994, pp. 531-547.

In the preparation of the blend or composition of the present invention, the components are mixed together by known means in the art at conditions to form a curable composition, preferably in liquid form. The curable epoxy resin composition of the present invention can be produced by mixing all the components of the composition together in any order. Alternatively, the curable resin composition of the present invention can be produced by preparing a first composition comprising the epoxy resin component and block copolymer; and a second composition comprising the curing agent component. All other components useful in making the resin composition may be present in the same composition, or some may be present in the first composition, and some in the second composition. The first composition is then mixed with the second composition to form the curable resin composition. The curable resin composition mixture is then cured to produce an epoxy resin thermoset material. Preferably, the curable resin composition is in the form of a liquid or paste.

Optionally, a neutral solvent may be employed in the blend to facilitate homogeneous mixing of the block copolymer, epoxy resin, and curing agent. The preferred optional solvent used in the present invention may include, for example, acetone and methyl ethyl ketone (MEK). In addition, other solvent choices can also be used as long as the solvent dissolves all the components.

An alternative method of making the modified resin of the present invention includes incorporating the block copolymer directly into an epoxy resin advancement reactor during the resin manufacturing step. In this embodiment, the composition of the present invention includes for example a liquid epoxy resin such as a diglycidyl ether of bisphenol A, a polyhydric alcohol such as bisphenol-A and a block copolymer such as an EO/BO block copolymer.

If the processing of the epoxy resin includes an advancement step, another method of making the modified resin of the present invention include adding the block copolymer into the reactants prior to the advancement reaction.

Still another alternative method of making the modified resin of the present invention include incorporating the block copolymer into curing agent used to cure the epoxy resin.

The block copolymer can be used in concentrations of 0.5 w/w percent to 10 w/w percent based on the formulated solids content of the cured epoxy system used in the adhesive application, preferably between 2 w/w percent and 6 w/w percent. The concentration of the block copolymer in the resin can be adjusted to provide the desired concentration in the final formulation or can be kept at higher concentration (masterbatch) and adjusted down with unmodified resin to desired final concentration.

Time and temperature of the process is not critical, but generally the components can be mixed at a temperature of from 10° C. to 60° C., preferably from 20° C. to 60° C. and more preferably from 25° C. to 40° C. for a sufficient time period until complete homogeneity is achieved.

The present invention comprised of the blend of an epoxy resin suitable for making an adhesive with a block copolymer which can be for example an EO/BO diblock copolymer or any other copolymer of similar structure may be used in various adhesive applications. The curable epoxy resin composition containing the polyether block copolymers of the present invention is used as an adhesive composition for bonding various substrates in various adhesive applications. The adhesive may be applied to a substrate by any well known methods such as spraying, brushing, rolling, flow coating, dipping or extruding a bead or ribbon, or with the use of apparatuses such as glue gun or brush/trowel, spray, dispensing nozzle, roll coating, transfer printing, screen printing, curtain coat, or application as a solid (film adhesive).

The mixture of epoxy resin, curing agent, block co-polymer, and any other modifiers present in the composition can be cured according to typical processes practiced by the industry. The temperature of curing can range generally from 10° C. to 200° C. These processes include ambient temperature cure (for example, 20° C.) to elevated temperature cures (for example, from 100° C. to 200° C.) using thermal, radiation or a combination of energy sources.

As is generally known, the time of cure can range generally from seconds to several hours or days depending on curing components, the final resin composition, and the particular end use for the adhesive.

The curable composition can be cured in one step or multiple steps or the curable composition can be post-cured using a different temperature or energy source after the initial cure cycle.

The block copolymers of the present invention may also advantageously be used for the toughening of epoxy adhesives for bonding the primary structure of cars. Such epoxy adhesives have to withstand high impact loads in a shear or peel mode in order to transfer, in the crash case, the loads to the bonded steel structure which absorbs or dissipates it through deformation. Brittle adhesives are not able to transfer any impact loads as they tend to split off.

Generally such epoxy impact resistant structural adhesives contain flexibilizers based on rubbers (such as CTBN). The high performance varieties contain a polyurethane toughener in addition to the rubber flexibilizer, where the polyurethane polymer chain is preferably capped with a phenolic group as disclosed for example in EP 308 664 B1. Other types of such adhesives containing such rubber type flexibilizers and polyurethane (PU)-tougheners combinations are described in WO 00/20483 A1, WO 01/94492 A1 and WO 03/078163 A1. Other types of structural epoxy adhesives are based on internally flexibilized epoxy resins which are combined with PU tougheners such as those described in WO 2004/055092 A1.

In all the above and similar impact resistant epoxy adhesives, based on flexibilized epoxy resin and a PU-based toughener, at least part of the flexibilizer and/or toughener may be replaced by one or more of the block copolymers of the present invention in order to reduce their cost.

These tougheners may also be incorporated into expandable or non-expandable epoxy, urethane or epoxy-urethane hybrid based adhesives or also into epoxy, urethane or epoxy-urethane hybrid foams that are used to fix structural reinforcing parts or acoustical inserts and baffles into vehicle cavities. Examples of such articles are shown in US20030099826, US20030194548, EP1435320 and EP1356911 but are not limited to these examples.

The following working examples are given to illustrate the invention and should not be construed as limiting its scope. Unless otherwise indicated, all parts and percentages are by weight.

Some of the raw materials used in the Examples were as follows:

D.E.R.* 383 is an epoxy resin having an EEW of 180 g/mole and commercially available from The Dow Chemical Company.
* Trademark of The Dow Chemical Company Amicure™ CG-1200 is a dicyandiamide commercially available from Air Products. The theoretical amine hydrogen equivalent weight of this product is 21 g/equiv.

Cab-O-Sil™ TS-720 is a fumed silica commercially available from The Cabot Corporation.

"2E4MI" stands for 2-Ethyl-4-methylimidazole (95 percent) and is a curing catalyst commercially available from The Aldrich Chemical Company. "DICP" stands for dicyandiamide curing agent.

"PEO-PBO" stands for a poly(ethylene oxide)-poly(butylenes oxide) diblock copolymer.

"PEO-PBO-PEO" stands for a poly(ethylene oxide)-poly(butylenes oxide)-poly(ethylene oxide) triblock copolymer.

PREPARATORY EXAMPLE A

Preparation PEO-PBO Diblock Copolymer

Part A: Preparation of Catalyzed Initiator

Diethylene glycol monomethyl ether (979.1 grams; 8.16 moles) and potassium hydroxide (29.84 grams; 85 weight percent) were combined in a closed system reaction vessel. The resultant mixture was heated to 110° C. and stripped under vacuum to remove the water (<500 ppm) formed in the reaction.

Part B: Preparation of Butylene Oxide Polymer

Catalyzed initiator (123.9 grams; approximately one mole of diethylene glycol monomethyl ether) prepared in Part A above was heated to 120° C. Butylene oxide (BO) (5355 grams; 74.38 moles) was slowly fed into the reactor such that the reaction temperature was maintained at 120° C. After addition of the BO to the reactor was complete, the mixture was digested until the pressure in the reactor no longer decreased. A portion of the reaction mixture was removed leaving 3052 grams of product in the reactor. More BO (1585 grams; 22.01 moles) was slowly added at a rate which maintained the reaction temperature at 120° C. When addition of the BO to the reactor was complete, the mixture was again digested until the pressure leveled off.

Part C: Preparation of Final Butylene Oxide-Ethylene Oxide Block Copolymer

Ethylene oxide (EO) (1830 grams; 41.59) was slowly added to the butylene oxide block polymer (4016 grams) prepared in Part B above such that the reaction temperature was maintained at 120° C. When addition of the EO to the reactor was complete, the mixture was digested until the pressure leveled off. Enough glacial acetic acid was then added to the mixture to bring the pH of the mixture to 6-7 (ASTM E70-90). The product was then transferred via a transfer line to a storage container while maintaining the product temperature above 50° C. to prevent solidification of the product in the transfer line. The final product, PEO-PBO block copolymer, had a number average molecular weight of 5397 as determined by titration of the polymer OH end groups (ASTM D 4274-94, Method D).

PREPARATORY EXAMPLE B

Preparation of PEO-PBO-PEO Triblock Copolymer

The basic procedure used to make the PEO-PBO diblock copolymer used in Preparatory Example A above was used in this example to make a PEO-PBO-PEO triblock copolymer except for the following changes. The final PEO-PBO-PEO product contained the following molar ratio of initiator/monomers:

1 mole propylene glycol/56 moles butylene oxide/62 moles of ethylene oxide

Part A: Preparation of Catalyzed Initiator

Propylene glycol was used in place of DOWANOL PM. In addition, an aqueous solution of KOH (46 weight percent solids) was used. The aqueous KOH was added to the reactor in an amount to give a final catalyst concentration of 9 weight percent. The water was not removed from the reaction product.

Part B: Preparation of Butylene Oxide Polymer

Butylene oxide was added in two batches. The amount of BO was adjusted so that an intermediate butylene oxide block had a number average molecular weight (Mn) of approximately 1000. When digestion was complete more of the aqueous KOH (46 weight percent) was added to the reactor so that the final catalyst concentration was approximately one weight percent. The water was removed from the reaction product under vacuum; then additional BO was added to the reactor to give the final butylene oxide polymer. The final butylene oxide polymer had a number average molecular weight of approximately 3500.

Part C: Preparation of Final PEO-PBO-PEO Triblock Copolymer

In order to obtain a liquid product, a mixture of ethylene oxide and butylene oxide (80/20 weight percent) was added to the butylene oxide prepared in Part B above. The incorporation of a small amount of butylene oxide in this step helps to disrupt the tendency of PEO to crystallize and form a solid. The amount of the added mixture was adjusted so that the final triblock had a number average molecular weight of approximately 6800 g/mole. The final reaction mixture was cooled to 60° C. and then neutralized through a magnesium silicate bed to give the final PEO-PBO-PEO triblock copolymer.

PREPARATORY EXAMPLE C

Preparation of Master Batches of Pre-Adhesive Formulations

D.E.R.* 383 epoxy resin was heated to ~50° C. in an external oven to reduce its viscosity. Into a one-quart Ross Planetary Mixer (model LDM) was added the D.E.R.* 383 resin, DICY, fumed silica and optionally the block copolymer. The amounts are shown in Table 1. Each mixture was degassed under full vacuum while being stirred for 15-20 minutes.

TABLE 1

| Pre-adhesive Blend # | Additive Type | DER 383 (g) | DICY (g) | Fumed Silica (g) | Additive (g) |
|---|---|---|---|---|---|
| 1 | Control | 200.0 | 10.0 | 10.0 | 0 |
| 2 | PEO-PBO-PEO Triblock Copolymer | 200.3 | 10.0 | 10.0 | 11.6 |
| 3 | PEO-PBO Diblock Copolymer | 200.7 | 10.0 | 10.0 | 11.6 |

EXAMPLES 1 AND 2 AND COMPARATIVE EXAMPLE A

Part A

Preparation of Adhesive Samples

To each of the Pre-Adhesive blends prepared in PREPARATORY EXAMPLE C above was added 2E4MI curing catalyst. The curing catalyst was mixed into the Pre-adhesive blend by hand to generate the adhesive formulation of the present invention. Table 2 shows the amount of 2E4MI used in each blend.

TABLE 2

| Example | Adhesive Blend # | Additive Type | Pre-Adhesive Amount (g) | 2E4MI Catalyst (g) |
|---|---|---|---|---|
| Comparative Example A | 1 | Control (Pre-Adhesive Blend #1) | 44.995 | 0.242 |
| Example 1 | 2 | PEO-PBO-PEO Triblock Copolymer (Pre-Adhesive Blend #2) | 46.295 | 0.239 |
| Example 2 | 3 | PEO-PBO Diblock Copolymer (Pre-Adhesive Blend #3) | 56.661 | 0.302 |

Part B

Preparation of T-Peel Adhesive Test Pieces

Cold rolled steel T-Peel test pieces (2.54 cm×10.2 cm×0.881 cm) were wiped clean with isopropanol then allowed to air dry for several minutes. A small amount of adhesive was placed on one-half of a test piece along with some 10 mil diameter glass beads from Cataphote. The other half of the test piece was then placed on top of the part containing the adhesive. The two halves were squeezed together to form a 0.254 mm bond line thickness. The excess adhesive was wiped off. The test piece was cured at 177° C. for 90 minutes.

Part C

T-Peel Test Procedure and Results

The test procedure used in this Example for measuring the T-Peel was ASTM method D1876-01 (Standard Test Method for Peel Resistance of Adhesives). A 0.42 cm/s crosshead speed was used. Five test pieces were run for each adhesive formulation. The average value of the T-Pell for the five test pieces is reported in Table 3.

TABLE 3

| Example | Adhesive Blend # | Additive Type | T-Peel Results (N/m) |
|---|---|---|---|
| Comparative Example A | 1 | Control | 362.7 |
| Example 1 | 2 | PEO-PBO-PEO Triblock Copolymer | 843.8 |
| Example 2 | 3 | PEO/PBO Diblock Copolymer | 1,670.0 |

What is claimed is:

1. A curable adhesive epoxy resin composition comprising
(a) an epoxy resin;
(b) an amphiphilic block copolymer containing at least one epoxy resin miscible block segment and at least one epoxy resin immiscible block segment; wherein the immiscible block segment comprises at least one polyether structure provided that the polyether structure of said immiscible block segment contains at least one or more alkylene oxide monomer units having at least four carbon atoms; in an amount such that when the epoxy resin composition is cured, the bond strength of the resulting cured epoxy adhesive resin composition increases compared to an epoxy resin composition without said amphiphilic polyether block copolymer; and
(c) at least one curing agent;
wherein the at least one epoxy resin miscible block segment contains a polyethylene oxide block, a propylene oxide block, or a poly(ethylene oxide-co-propylene oxide) block; and the at least one epoxy resin immiscible block segment contains a polybutylene oxide block, a polyhexylene oxide block, or a polydodecylene oxide block.

2. A curable adhesive epoxy resin composition comprising
(a) an epoxy resin;
(b) an amphiphilic block copolymer containing at least one epoxy resin miscible block segment and at least one epoxy resin immiscible block segment; wherein the immiscible block segment comprises at least one polyether structure provided that the polyether structure of said immiscible block segment contains at least one or more alkylene oxide monomer units having at least four carbon atoms; in an amount such that when the epoxy resin composition is cured, the bond strength of the resulting cured epoxy adhesive resin composition increases compared to an epoxy resin composition without said amphiphilic polyether block copolymer; and
(c) at least one curing agent;

wherein the at least one of the epoxy resin miscible block segments of the amphiphilic block copolymer is a poly(ethylene oxide); and the at least one of the epoxy resin immiscible block segments of the amphiphilic block copolymer is a polybutylene oxide).

3. A curable adhesive epoxy resin composition comprising
(a) an epoxy resin;
(b) an amphiphilic block copolymer containing at least one epoxy resin miscible block segment and at least one epoxy resin immiscible block segment; wherein the immiscible block segment comprises at least one polyether structure provided that the polyether structure of said immiscible block segment contains at least one or more alkylene oxide monomer units having at least four carbon atoms; in an amount such that when the epoxy resin composition is cured, the bond strength of the resulting cured epoxy adhesive resin composition increases compared to an epoxy resin composition without said amphiphilic polyether block copolymer; and
(c) at least one curing agent;
wherein the amphiphilic block copolymer is poly(ethylene oxide)-b-poly(butylene oxide) or poly(ethylene oxide)-b-poly(butylene oxide)-b-poly(ethylene oxide).

4. The composition of claim 1 wherein the amphiphilic block copolymer has a number average molecular weight of from 1000 to 30,000.

5. The composition of claim 1 wherein the ratio of the epoxy resin miscible segments of the amphiphilic block copolymer to the epoxy resin miscible segments of the amphiphilic block copolymer is from 10:1 to 1:10.

6. The composition of claim 1 wherein the amphiphilic block copolymer is present in an amount of from 0.1 weight percent to 30 weight percent based on the weight of the composition.

7. The composition of claim 1 wherein the epoxy resin is selected from the group consisting of polyglycidyl ethers of polyhydric alcohols, polyglycidyl ethers of polyhydric phenols, polyglycidyl amines, polyglycidyl amides, polyglycidyl imides, polyglycidyl hydantoins, polyglycidyl thioethers, epoxidized fatty acids or drying oils, epoxidized polyolefins, epoxidized di-unsaturated acid esters, epoxidized unsaturated polyesters, and mixtures thereof.

8. The composition of claim 1 wherein the epoxy resin is a glycidyl polyether of a polyhydric alcohol or a glycidyl polyether of a polyhydric phenol.

9. The composition of claim 1 wherein the epoxy resin is selected from the group consisting of 3,4-epoxycyclohexylmethyl-3,4-epoxycyclohexyl carboxylate; 1,2-epoxy-4-vinylcyclohexane; bis(7-oxabicyclo[4.1.0]hept-3-ylmethyl hexanedioic acid ester; 3,4-epoxycyclohexanecarboxylate methyl ester; and mixtures thereof.

10. The composition of claim 1 including a homopolymer of identical composition to the epoxy resin immiscible block segment.

11. The composition of claim 1 including a homopolymer of identical composition to the epoxy resin miscible block segment.

12. The composition of claim 1 wherein the polyepoxide has an epoxide equivalent weight of from 150 to 3,000.

13. The composition of claim 1 including a curing catalyst.

14. A process for preparing a curable adhesive epoxy composition comprising mixing
(a) an epoxy resin;
(b) an amphiphilic block copolymer containing at least one epoxy resin miscible block segment and at least one epoxy resin immiscible block segment; wherein the immiscible block segment comprises at least one polyether structure provided that the polyether structure of said immiscible block segment contains at least one or more alkylene oxide monomer units having at least four carbon atoms; in an amount such that when the epoxy resin composition is cured, the bond strength of the resulting cured epoxy adhesive resin composition increases compared to an epoxy resin composition without said amphiphilic polyether block copolymer; and
(c) at least one curing agent;
wherein the at least one of the epoxy resin miscible segments of the amphiphilic block copolymer is a poly(ethylene oxide); and the at least one of the epoxy resin immiscible segments of the amphiphilic block copolymer is a poly(butylene oxide).

15. Two or more substrates bonded with the adhesive composition of claim 1.

16. The composition of claim 1 including a filler.

17. The composition of claim 16 wherein the filler is selected from the group consisting of fumed silica, colloidal silica, bentonite clay, mica, atomized aluminum powder, and mixtures thereof.

18. The composition of claim 16 wherein the concentration of filler is up to 300 phr.

19. The composition of claim 1 wherein the amphiphilic polyether block copolymer is selected from the group consisting of a diblock, a linear triblock, a linear tetrablock, a higher order multiblock structure; a branched block structure; or a star block structure.

* * * * *